United States Patent
Jangamara Hosalli Mathad et al.

(10) Patent No.: US 11,803,363 B2
(45) Date of Patent: Oct. 31, 2023

(54) IOT DEVICE UPDATE

(71) Applicant: HEWLETT PACKARD ENTERPRISE DEVELOPMENT LP, Houston, TX (US)

(72) Inventors: Thippeswamy Jangamara Hosalli Mathad, Bangalore (IN); Sudharshan Ramaiah, Bangalore (IN); Ganesh Lokanath, Bangalore (IN); Sandeep Konduru, Bangalore (IN); Madhu Bhandimata, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 128 days.

(21) Appl. No.: 17/223,536

(22) Filed: Apr. 6, 2021

(65) Prior Publication Data
US 2022/0027140 A1    Jan. 27, 2022

(30) Foreign Application Priority Data

Jul. 27, 2020   (IN) .............................. 202041032000

(51) Int. Cl.
*G06F 8/65* (2018.01)
*G06F 21/44* (2013.01)
*G16Y 30/00* (2020.01)

(52) U.S. Cl.
CPC ................ *G06F 8/65* (2013.01); *G06F 21/44* (2013.01); *G16Y 30/00* (2020.01)

(58) Field of Classification Search
CPC ........ G06F 8/65; G06F 8/658; G06F 11/0709; G06F 21/44; G16Y 30/00; H04W 4/80
See application file for complete search history.

(56) References Cited

U.S. PATENT DOCUMENTS

| | | | | |
|---|---|---|---|---|
| 10,645,073 | B1 * | 5/2020 | Agarmore | G06F 21/30 |
| 2009/0133012 | A1 * | 5/2009 | Shih | H04N 21/6543 |
| | | | | 717/169 |
| 2016/0014545 | A1 * | 1/2016 | Tian | H04W 76/10 |
| | | | | 455/41.2 |
| 2018/0150289 | A1 * | 5/2018 | Adrangi | G06F 8/65 |
| 2018/0331891 | A1 * | 11/2018 | Zhao | H04L 41/0846 |
| 2021/0004222 | A1 * | 1/2021 | Huang | H04L 65/1016 |
| 2021/0019133 | A1 * | 1/2021 | Rusev | H04L 41/20 |

OTHER PUBLICATIONS

Timothy Claeys et al.; Securing Complex IoT Platforms with Token Based Access Control and Authenticated Key Estrablishment; IEEE; 9 pages; retrieved on Jan. 28, 2022 (Year: 2017).*

(Continued)

*Primary Examiner* — S. Sough
*Assistant Examiner* — Cuong V Luu
(74) *Attorney, Agent, or Firm* — Hewlett Packard Enterprise Patent Department (57) ABSTRACT

Examples include receiving determining a leader Internet of Things (IoT) device in a region, sending an instructions update to the leader IoT device, and sending an update token to a number of secondary IoT devices in the region. The update token comprises information for the secondary IoT devices to receive the instructions update from the leader IoT device. The leader IoT device is selected based on which of configurations of a plurality of IoT devices in the region fulfills a target capability.

21 Claims, 9 Drawing Sheets

(56) References Cited

OTHER PUBLICATIONS

Yugo Nakamura et al.; In-situ Resource Provisioning with Adaptive Scale-out for Regional IoT Services; ACM; pp. 203-213; retrieved on Apr. 28, 2023 (Year: 2018).*

Lan Luo et al.; On Security of TrustZone-M-Based IoT Systems; IEEE; pp. 9683-9699; retrieved on Apr. 28, 2023 (Year: 2022).*

HPE, "Universal Internet of Things (IoT) Platform", available online at <https://www.hpe.com/in/en/solutions/iot-platform.html>, 2021, 5 pages.

IEEE Access, "D2D Communications: Security Issues and Resource Allocation", available online at <https://ieeeaccess.ieee.org/closed-special-sections/d2d-communications-security-issues-and-resource-allocation/>, Feb. 28, 2019, 1 page.

Wikipedia, "OAuth", available online at <https://en.wikipedia.org/w/index.php?title=OAuth&oldid=971688708>, Aug. 7, 2020, 8 pages.

\* cited by examiner

IOT DEVICE UPDATE

BACKGROUND

The Internet of Things (IoT) may be defined as a system of computing objects that are provided with unique identifiers that allow them to transfer data over a network. These objects may be embedded with sensors that enable these objects to collect and exchange data.

BRIEF DESCRIPTION OF THE DRAWINGS

The following detailed description references the drawings, wherein.

DETAILED DESCRIPTION

In the Internet of Things (IoT), "things" may refer to a wide variety of computing devices such as heart monitoring implants, biochip transponders on farm animals, automobiles with built-in sensors, smart lights, manufacturing sensors on assembly lines, and smart thermostat systems that may allow remote monitoring. Each "thing" may be assigned a unique identifier (for example, an IP address) and provided with the ability to collect and exchange data over a network. Accordingly, an IoT device may comprise a computing device that is able to sense or read its environment and communicate those readings via a network.

IoT devices may connect to a remote computing device (e.g., a server) that gathers the data collected by the IoT devices. The remote computing device may be a central point of controlling and/or monitoring multiple IoT devices that are related, similar, or implemented in one system. For example, the server may host an IoT platform to control, manage, and IoT devices used in an assembly line in a factory. The remote computing device may also communicate to an administrator of the IoT devices, allowing the administrator to monitor and control the IoT devices via the IoT platform.

In some examples, the IoT device has instructions stored on a non-transitory machine-readable storage medium (e.g., firmware) that are executable by a processing resource allowing the IoT device to perform its monitoring, reporting, communication, etc. functions. However, as the IoT device is installed and used in the environment (e.g., a plant or assembly line), this firmware may need to be updated due to manufacturing requirements, security fixes, enhanced features, etc.

In some situations, the IoT platform may receive the firmware update from the IoT manufacturer and the IoT platform then pushes the update to each and every IoT device that it monitors. The communication between the IoT device and the IoT platform may be accomplished via a computing network (e.g., local area network (LAN), virtual LAN (VLAN), wireless local area network (WLAN), a virtual private network (VPN), the Internet, etc.). In an IoT system where the IoT platform communicates with a large number of IoT devices, the bandwidth that is required to update each and every IoT device directly from the IoT platform is high as each payload in the data packet sent by the IoT platform comprises the firmware update. Additionally, the physical distance from the IoT platform and the physical IoT device may also increase the time it takes for the IoT device updates to be completed. The combination of these factors (payload size and distance) may result in long periods of time (e.g., months) for each IoT device in the IoT system to be updated. This results in long gaps of time in which the IoT system is mismatched, with some IoT devices updated and others not updated. This may affect reliability and performance of the entire IoT system.

Examples disclosed herein address these technological issues by allowing the IoT platform to authorize specific IoT devices in the IoT system to provide firmware updates to other IoT devices and thus results in a cascading effect. The IoT platform may identify specific IoT devices in an IoT system as leader IoT devices and send the firmware update to these leader IoT devices. The IoT platform may then send an update token to the remaining IoT devices in the IoT system. The update token includes information that allows each remaining IoT devices to send a message to a leader IoT device in an area that is within the same region and request the firmware update. Based on the information in the token, the leader IoT device may authenticate the remaining IoT devices and send the firmware update upon authentication.

Accordingly, examples discussed herein allow for faster update of the entire IoT system by allowing multiple points of firmware update distributions. Additionally, because the subsequent firmware updates provided by the leader IoT devices are communicated over a "local" communication network (e.g., Long range (LoRa) WAN) as compared to the communication network used between the IoT platform and the IoT device (e.g., Internet), the payloads are moved over a shorter distance, resulting in quicker updates.

In some examples, a method is provided that includes determining a leader IoT device in a region, sending an instructions update to the leader IoT device, and sending an update token to a number of secondary IoT devices in the region. The update token includes information for the secondary IoT device to receive the instructions update from the leader IoT device.

In some examples, an IoT system includes a platform engine and a first leader IoT device. The platform engine is to determine a first leader IoT device and a secondary IoT device from a plurality of IoT devices, send instructions update to the first leader IoT device, and send a first update token to the secondary IoT device. The secondary IoT device is in a long range region with the first leader IoT device. The update token comprises an authentication key. The first leader IoT device is to receive the update token from the secondary IoT device, authenticate the secondary IoT device based on the update token, and send the instructions update to the secondary IoT device.

In some examples, a non-transitory machine-readable storage medium includes instructions to determine a first leader IoT device for a first region, determine a second leader IoT device for a second region, send a firmware update to the first and second leader IoT devices, determine a first number of secondary IoT devices in the first region, determine a second number of secondary IoT devices in the second region, send a first update token to each of the first number of secondary IoT devices, and send a second update token to each of the second number of secondary IoT devices. The first update token includes information for the first leader IoT device to authenticate the first number of secondary IoT devices. The second update token includes information for the secondary leader IoT device to authenticate the second number of IoT devices.

Figure 1:
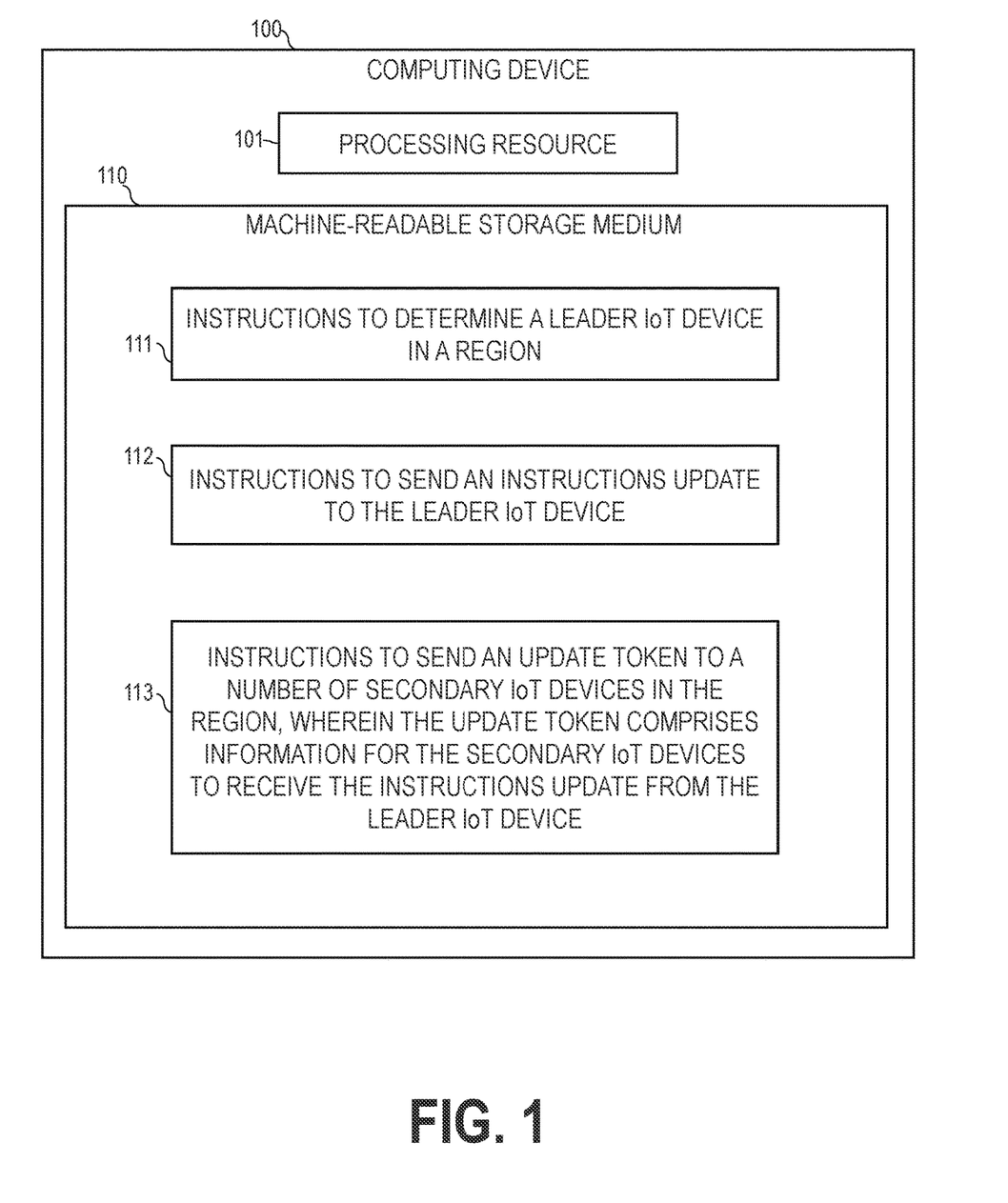
FIG. 1 is a block diagram of a computing device to determine a leader IoT device and send an instructions update to the leader IoT device, according to some examples.

Referring now to the figures, FIG. 1 is a block diagram of a computing device 100 to send an instructions update to a leader IoT device. As used herein, a "computing device" may include a server, a networking device, a chipset, a desktop computer, a workstation, a mobile phone, a tablet, an electronic reader, or any other processing device or equipment.

Computing device 100 includes a processing resource 101 and a machine-readable storage medium 110. Machine readable storage medium 110 may be in the form of non-transitory machine-readable storage medium, such as suitable electronic, magnetic, optical, or other physical storage apparatus to contain or store information such as instructions 111, 112, 113, related data, and the like.

As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and a secondary memory. The secondary memory can, for example, include a non-volatile memory where a copy of software or other data is stored.

In the example of FIG. 1, instructions 111, 112, and 113 are stored (encoded) on storage medium 110 and are executable by processing resource 101 to implement functionalities described herein in relation to FIG. 1. In some examples, storage medium 110 may include additional instructions, like, for example, the instructions to implement some of the functionalities described in relation to server 200 or computing device 700 in FIG. 7. In other examples, the functionalities of any of the instructions of storage medium 110 may be implemented in the form of electronic circuitry, in the form of executable instructions encoded on machine-readable storage medium, or a combination thereof.

Processing resource 101 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 111, 112, and 113 as described herein.

Instructions 111 may be executable by processing resource 101 to determine a leader IoT device in a region. For example, computing device 100 may monitor and/or control a plurality of IoT devices distributed across multiple physical locations. IoT devices in the same physical location may communicate with each other using a low power wide area network (LPWAN). Non-limiting examples of these low power networking protocols include narrowband IoT (NB-IoT), long range wide area network (LoRa WAN), SigFox, etc. For example, devices in LoRa WAN may communicate with each other by sending a packet from one IoT device to a gateway in the WAN. That packet is then routed to the other IoT device in the WAN from the gateway. Accordingly, as used herein, "a region" refers to a physical space in which IoT devices located in that space may reach each other using a LPWAN protocol. The region may be tied to a specific physical distance. For example, in some LPWAN protocols (e.g., LoRa WAN), the distance that a region covers from one IoT device to another IoT device may be 10 kilometers. In other LPWAN protocols, the distance may be greater or less than 10 km. A "region" may represent a floor of a building, an entire building, an assembly line of a factory, a certain street, etc.

In some examples, computing device 100 may receive (from an administrator of the IoT system) which device is to be a leader IoT device and uses this indication to determine the leader IoT device. In other examples, computing device 100 may determine the leader IoT device based on characteristic of the IoT device. For example, computing device 100 may store key characteristics of each IoT device on a storage medium of computing device 100. Based on these characteristics and the required characteristics of the specific update, computing device 100 may determine a leader IoT device in a specific region by picking an IoT device out of the plurality of IoT devices that have the required specific characteristics.

For example, to process a specific firmware update, the IoT device may require specific hardware components (e.g., specific processing units, storage space, etc.) and/or may be enabled with specific software instructions (e.g. decryption software, etc.) to adequately process authentication keys and/or store the firmware update to be a leader IoT device. Instructions 111 may determine a leader IoT device based on which IoT device in a region has the required characteristics needed for the specific update. In some examples, instructions 111 may also keep a history of which IoT devices were leader devices in past firmware updates (updates occurring before the current update). Instructions may determine that an IoT device should be a leader IoT device for a current update because it was a leader device in a prior update. Conversely, instructions may determine that an IoT device should not be a leader IoT device for a current update because it was a leader device in a prior update and that prior update resulted in an error.

In yet other examples, the specific update does not require any special processing unit and/or software installed. In these examples, instructions 111 may arbitrarily determine a leader IoT device in a region. In these examples, the IoT devices in a region may be substantially similar to one another in terms of hardware and software components and/or configurations.

Instructions 111 may determine one or more leader IoT devices in a region (e.g., one leader IoT device, two leader IoT devices, three leader IoT devices, etc.)

Instructions 112 may be executable by processing resource 101 to send an instructions update to each leader IoT device determined by instructions 111. As used herein, "instructions update" includes a new machine-executable instructions, that, when executed by a processing resource, rewrites or changes the existing machine-executable instructions on the IoT device. In some examples, the instructions update comprises a firmware update. The payload of this instructions update is not sent by a LPWAN protocol, but rather a different networking protocol.

Instructions 113 may be executable by processing resource 101 to send an update token to a number of secondary IoT devices in the region. As discussed above, computing device 100 may understand the composition of the IoT devices in the IoT system it monitors, including the IoT devices in a certain region. In some examples, for a specific update round, instructions 113 may include instructions to determine that every other IoT device besides the leader IoT devices (as determined by instructions 111) in the region is a secondary IoT device. Thus, as used herein, "a number of secondary IoT devices" may include all of these other devices, or a portion of these other devices.

The update token includes information for the secondary IoT devices to receive the instructions update (e.g., firmware update) from a leader IoT device. Accordingly, this information may include identifying information for the leader IoT devices, such as the IP address of the leader IoT devices. This allows the secondary IoT devices to understand where to send a message to ask for the update. This information also includes an authentication key. The authentication key may include secure alphanumeric characteristics that lets the leader IoT device know that the secondary IoT device has permission to receive the update. As discussed above, in some examples, the leader IoT device(s) are chosen by instructions 111, in part, based on the leader IoT device's extra ability to process (e.g., processing unit, additional software capability, etc.) the authentication keys. Accordingly, in some examples, the authentication keys sent by instructions 113 are encrypted and need to be processed (e.g., decrypted) by the leader IoT to determine its authenticity.

Accordingly, once a secondary IoT device receives the update token from computing device 100, the secondary IoT device may send a message to the leader IoT device identified in the update token to request a firmware update. It may then send the update token to the leader IoT device to authenticate itself. Upon the authentication, it may receive the firmware update from the leader IoT device without having to wait to receive it directly from computing device 100. Accordingly, computing device 100 and examples disclosed herein allow for the orchestration one or more "leader" IoT devices updating many "secondary" IoT devices in a region leading to faster update of an IoT system.

Figure 2:
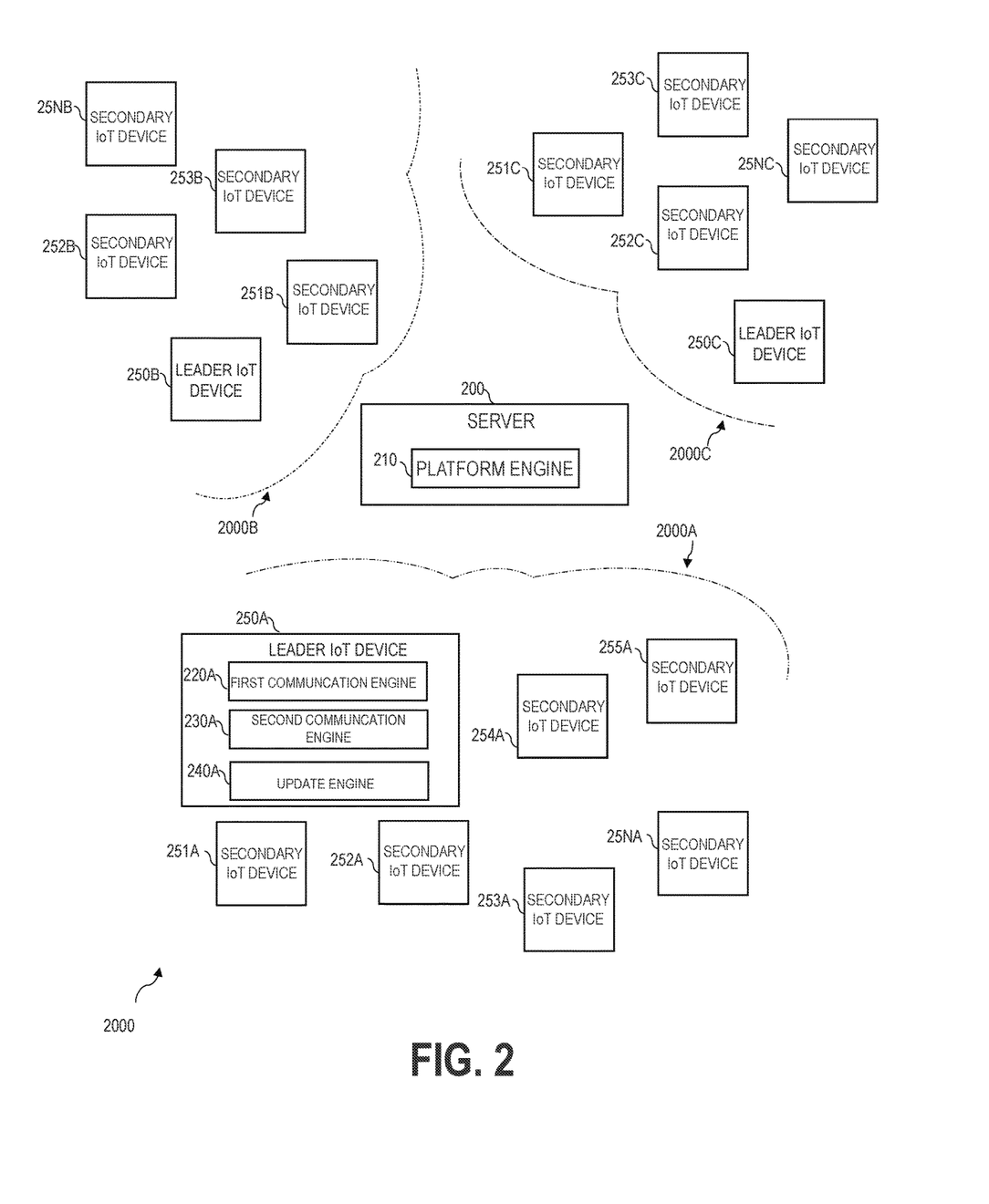
FIG. 2 is a block diagram of an IoT system with a plurality of IoT devices interacting with an IoT platform, according to some examples.

Computing device 100 of FIG. 1, which is described in terms of processors and machine-readable storage mediums, can include one or more structural or functional aspects of server 200 of FIG. 2, which is described in terms of engines containing hardware and software.

FIG. 2 shows a block diagram of an IoT system 2000. IoT system 2000 comprises server 200, and three IoT regions 2000A, 2000B, and 2000C.

Server 200 comprises platform engine 210. IoT region 2000A comprises leader IoT device 250A, and secondary IoT devices 251A, 252A, 253A, 254A, and 255A. There may more 5 secondary IoT devices in region 2000A, which is represented by 25NA in FIG. 2. IoT region 2000B comprises leader IoT device 250B, and secondary IoT devices 251B, 252B, 253B, and 254B. There may more 4 secondary IoT devices in region 2000B, which is represented by 25NB in FIG. 2. IoT region 2000C comprises leader IoT device 250C, and secondary IoT devices 251C, 252C, 253C, and 254C. There may more 4 secondary IoT devices in region 2000C, which is represented by 25NC in FIG. 2.

As discussed above, IoT devices in region 2000A may communicate with each other via a first LPWAN, IoT devices in region 2000B may communicate with each other via a second LPWAN, and IoT devices in region 2000B may communicate with each other via a third LPWAN. The LPWANs are represented by dotted lines in FIG. 2. Communications between server 200 and an IoT device in either of regions 2000A, 2000B, and 2000C may require other networking protocols than LPWAN. For example, a packet sent from server 200 to leader IoT device 250A may use the Internet as a way of communicating.

Server 200 comprises platform engine 210. Other engines may be added to server 200 for additional or alternative functionality.

Engine 210 may be any combination of hardware (e.g., a processor such as an integrated circuit or other circuitry) and software (e.g., machine or processor-executable instructions, commands, or code such as firmware, programming, or object code) to implement the functionalities as discussed below in relation to engine 210. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or hardware and software hosted at hardware. Additionally, as used herein, the singular forms "a," "an," and "the" include plural referents unless the context clearly dictates otherwise. Thus, for example, the term "engine" is intended to mean at least one engine or a combination of engines. In some examples, however, hardware packet processing engine 203 comprises an integrated circuit, for example, an ASIC, a field programmable gate array (FPGA), etc. that is designed for packet processing.

Engine 210 of server 200 can include at least one machine-readable storage mediums (for example, more than one) and at least one computer processor (for example, more than one). For example, software that provides the functionality of engines on server 200 can be stored on a memory of the server 200 to be executed by a processor of the server 200.

Platform engine 210 includes a combination of hardware and software that allows server 200 to determine one or more leader IoT device for each of regions 200A, 200B, and 200C. Platform engine 210 may understand the composition of each region and understand the specific hardware and software configuration of each IoT device in each region. Platform engine 210 may receive a firmware update that is sent to it by a manufacturer of IoT system 2000. The manufacturer of IoT system 2000 may also send to platform engine 200 information as to what is required for an IoT device to be a leader IoT device, such as requirements needed to process the authentication key, etc. Based on these requirements, platform engine 210 may then determine one or more leader IoT devices in each region based on which IoT devices fulfills the requirements. While FIG. 2 shows three regions, an IoT system may have more regions than those shown. In those examples, platform engine 210 will determine at least one leader IoT device for each region.

Platform engine 210 also allows server 200 to determine a number of secondary IoT devices in each region. It may determine this by looking at which IoT devices are within a low power communication range (i.e., inside the same "region" or in an LPWAN) with which leader IoT device. For example, IoT devices, 251A, 252A, 253A, 254A, and 255A are in a low power communication range with leader IoT device 250A but IoT devices 251B, 252B, 253B, and 254B are not. Accordingly, it determines that IoT devices 251A, 252A, 253A, 254A, and 255A devices are secondary for leader IoT device 250A. While FIG. 2 shows each region as having one leader IoT device, each region can have more than one (e.g., two leader IoT devices, three leader IoT devices, etc.). In these examples, platform engine 210 may assign the secondary IoT devices evenly among the leader IoT devices in the same region (many secondaries to one leader), or may assign the secondary IoT devices to all leader IoT devices in the same region (one secondary to many leaders). Thus, in the one secondary to many leaders example, the secondary IoT devices may contact any leader IoT device in its region for an update.

Platform engine 210 may also allow server 200 to send the firmware update to each leader IoT device 250A, 250B, and 250C. This firmware update may be characterized as an "instructions update." In some examples, platform engine 210 may also send to the leader IoT devices an authentication key that may be used to authenticate the secondary IoT devices. This authentication key may be characterized as a "leader" authentication key.

Platform engine 210 then sends an update token to secondary IoT devices 251A, 252A, 253A, 254A, 255A, 251B, 252B, 253B, 254B, 251C, 252C, 253C, 254C. Each update token comprises an authentication key. Additionally, each update token comprises address information (e.g., Internet protocol IP address) for a leader IoT device that is specific to the region of the secondary IoT device. For example, for secondary IoT device 251A, the update token sent by platform engine 210 includes the address for leader IoT device 250A and not leader IoT device 250B. As another example, for secondary IoT device 251B, the update token sent by platform engine 210 includes the address for leader IoT device 250B and not leader IoT device 250A. In some examples, the authentication key sent by platform engine 200 is similar across all the regions. In other examples, the authentication key sent by platform engine 200 is different across the regions. In these examples, the authentication key sent to secondary IoT device 251A is different from the authentication key sent to secondary IoT device 251B.

The leader IoT device 250A may receive the firmware update from server 200 and install the firmware update so that it is running the new firmware. Additionally, leader IoT device 250A may store a copy of the firmware update in a format so it may be sent to the secondary IoT devices in region 2000A via the LPWAN of region 2000A. Accordingly, leader IoT device 250A may have a first communication engine 220A which allows it to communicate to secondary IoT devices in region 2000A via the LPWAN protocol of region 2000A. For example, the first communication engine 220A may allow leader IoT device 250A to be compatible with LoRa WAN networks and send the firmware update via LoRa WAN. First communication engine 220A may also allow leader IoT device 250A to receive update tokens from secondary IoT devices in region 2000A.

Additionally, leader IoT device 250A may have a second communication engine 230A which allows it to communicate to server 200 and platform engine 210 via another networking protocol. Thus, second communication engine 230A may allow leader IoT device 250A to receive the firmware update from server 200.

Leader IoT device 250A may also comprise update engine 240A which allows leader IoT device 250A to authenticate the secondary IoT device based on the update token that is received. This may be characterized as validating the authentication key. In some examples, this can be accomplished by ensuring that the authentication key in the update token accurately matches a leader authentication key sent by the server 200 to leader IoT device 250A. For example, leader IoT device 250A may receive by the first communication engine 220A the leader authentication key from platform engine 210. The leader authentication key may be encrypted by a public key. Update engine 240A may have a private key that allows leader IoT device 250A to decrypt the leader authentication key sent by platform engine 210, Similarly, update engine 240A may decrypt the authentication key in the update token received from secondary IoT device using the same private key. Based on a determination that the two authentication keys match, update engine 240A may authenticate the secondary IoT device authenticate (determine that the authentication key is valid) and send the firmware update to secondary IoT device.

In some examples, in addition to or instead of comparing the two authentication keys, update engine 240A can validate the authentication key in the update token by ensuring the authentication key follows certain rules or algorithms that are pre-set by a manufacturer of the IoT system.

Each engine 220A, 230A, and 240A of leader IoT device 250A can include at least one machine-readable storage mediums (for example, more than one) and at least one computer processor (for example, more than one). For example, software that provides the functionality of engines on leader IoT device 250A can be stored on a memory of the leader IoT device 250A to be executed by a processor of the leader IoT device 250A. Each engine 220A, 230A, and 240A may be any combination of hardware (e.g., a processor such as an integrated circuit or other circuitry) and software (e.g., machine or processor-executable instructions, commands, or code such as firmware, programming, or object code) to implement the functionalities as discussed in relation to the respective engine.

Secondary IoT device 251A may also include a first communication engine (not pictured in FIG. 2) and a second communication engine (not pictured in FIG. 2), similar to that described in relation to leader IoT device 250A. However, first communication engine of secondary IoT device 251A allows secondary IoT device 251A to communicate to leader IoT device 250A and other secondary IoT devices and allows it to send the update token to leader IoT device 250A and to receive the firmware update from leader IoT device 250A. Additionally, the second communication engine of secondary IoT device 251A allows it to communicate to server 200 to receive an update token from server 200. In some examples, secondary IoT device 251A may also include an update engine (not pictured in FIG. 2). Accordingly, secondary IoT device 251A may also could have been chosen by platform engine 210 as a leader IoT device in region 2000A and can be chosen as a leader IoT device in subsequent (or later updates than the current firmware update) in addition to leader IoT device 250A.

Secondary IoT devices 252A, 253A, 254A, and 25NA are similar to 251A as described above. Regions 2000B and 2000C are similar to region 2000A, with leader IoT devices 250B and 250C being similar to leader IoT device 250A and secondary IoT devices 251B, 252B, 253B, 25NB, 251C, 252C, 253C, 25NC being similar to secondary IoT device 251A.

Figure 3A:
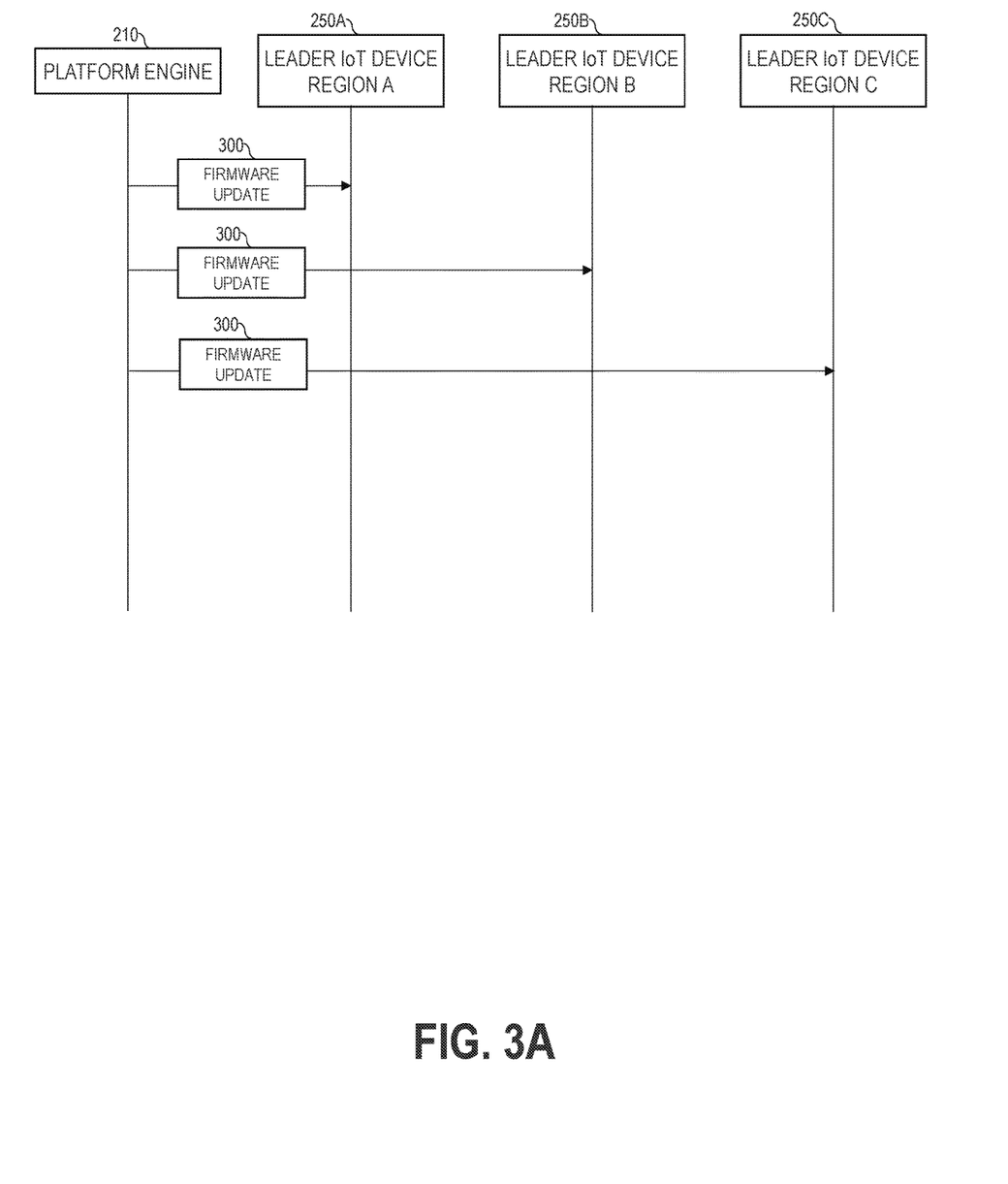
FIG. 3A is a representation of communications between the IoT platform and a number of leader IoT devices in the IoT system of FIG. 2, according to some examples.
Figure 3B:
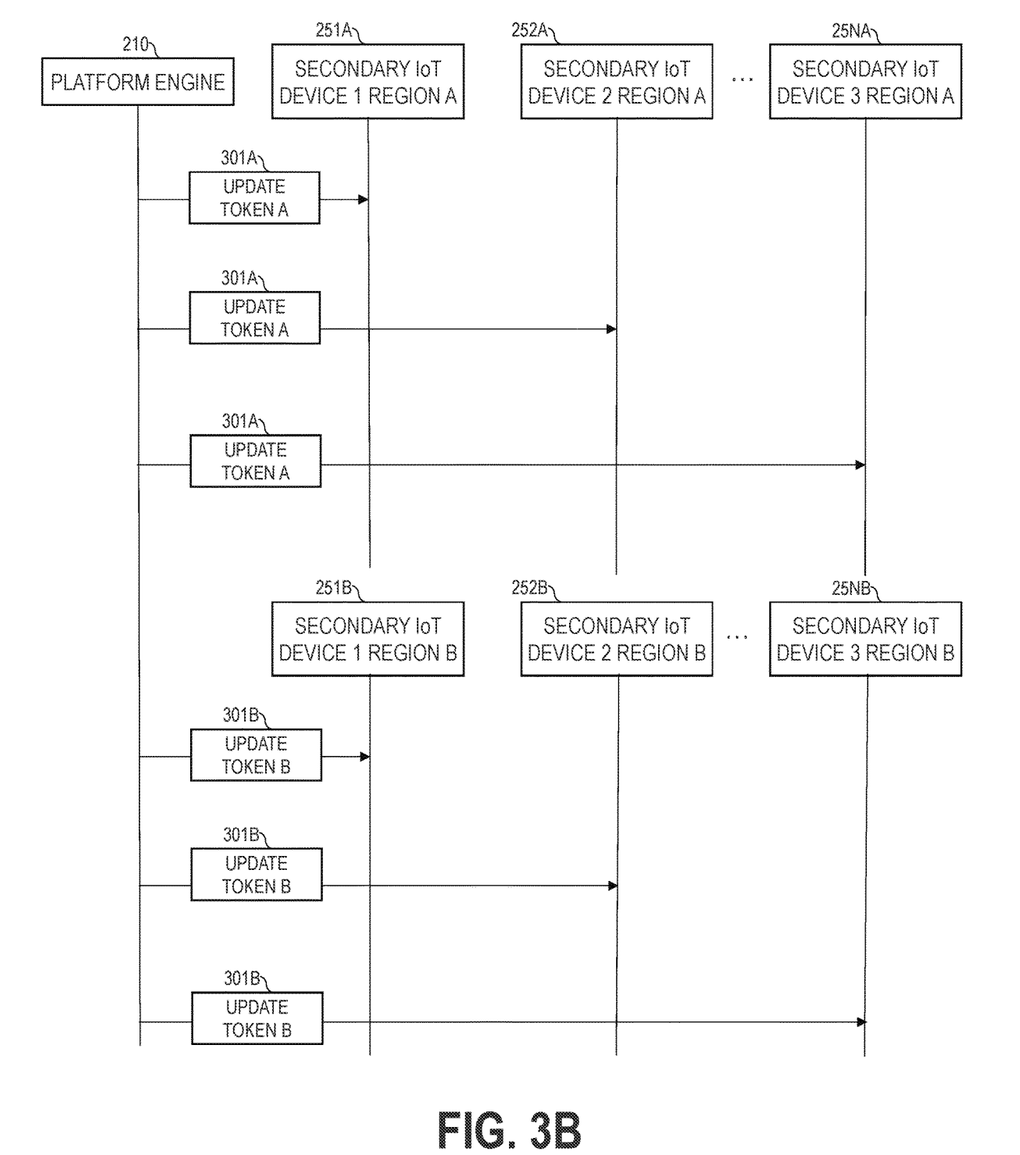
FIG. 3B is a representation of the communications between the IoT platform and a number of secondary IoT devices in the IoT system of FIG. 2, according to some examples.
Figure 3C:
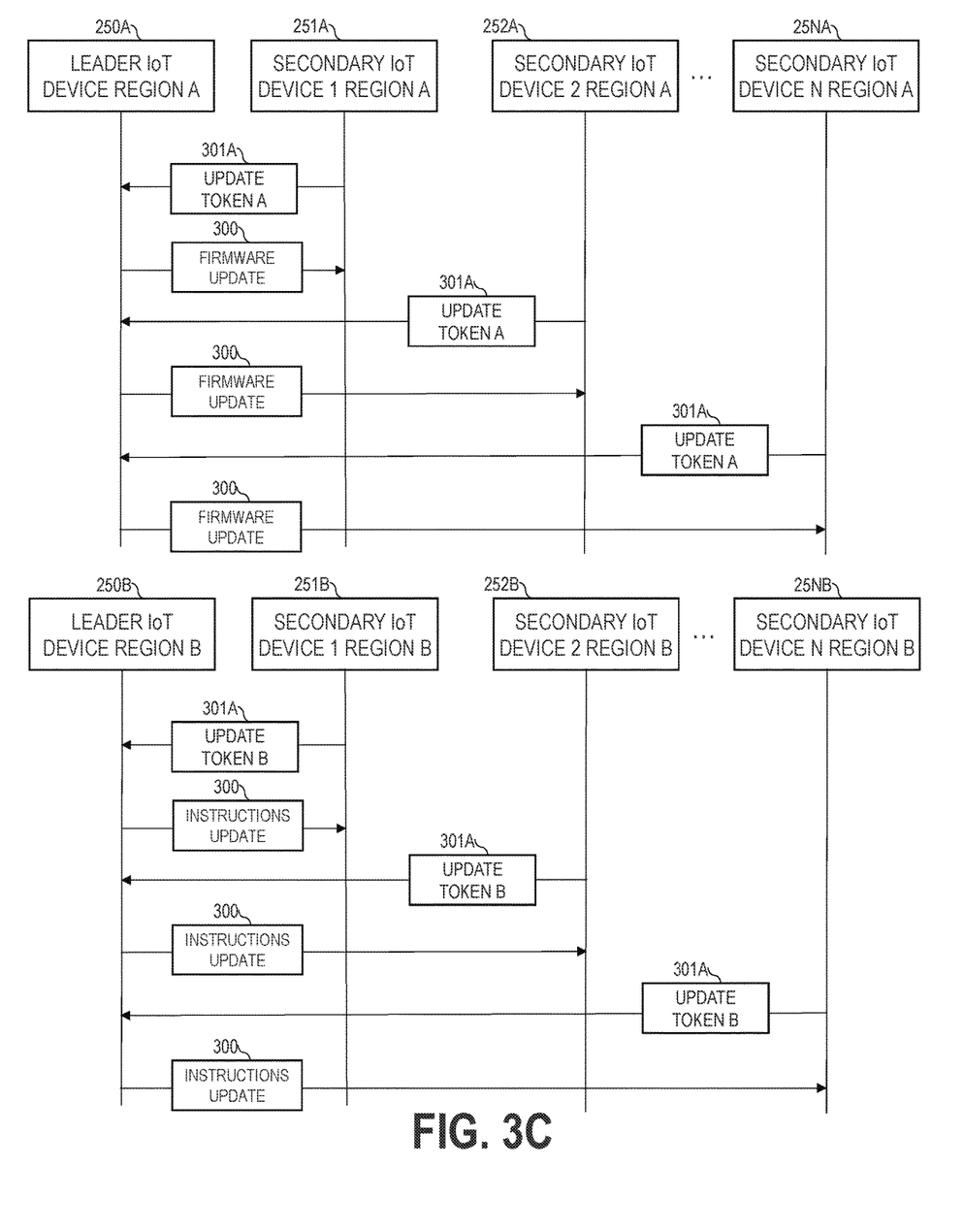
FIG. 3C is a representation of the communications between the leader IoT devices and number of secondary IoT devices in the IoT system of FIG. 2, according to some examples.

FIGS. 3A-3C show a representative communication flow between server 200, leader IoT devices 250A, 250B, 250C, secondary IoT devices 251A, 252A-25NA, 251B, 252B-25NB.

In FIG. 3A, platform engine 210 of server 200 determines that IoT device 250A is a leader IoT device in region 2000A, IoT device 250B is a leader IoT device in region 2000B, and IoT device 250C is a leader IoT device in region 2000C. Platform engine 210 sends firmware update 300 to each leader IoT device 250A, 250B, and 250C. As discussed above, the firmware update 300 may also include a leader authentication key that the leader IoT devices may use to later validate the authenticity of the update tokens it receives from the secondary IoT devices.

Referring to FIG. 3B, platform engine 210 determines that the remaining IoT devices in regions 2000A and 2000B are secondary IoT devices for their respective regions. Platform engine 210 sends update token A 301A to the remaining IoT devices in region 2000A (251A, 252A . . . 25NA). Platform engine 210 also sends update token B 301B to the remaining IoT devices in region 2000B (251B, 252B . . . 25NB). The update tokens comprise an address for the leader IoT device specific to the region and an authentication key. Accordingly, update token A may include an address for leader IoT device 250A and update token B may include an address for leader IoT device 250B. In some examples, the authentication key for region 2000A may be different than the authentication key for region 2000B. In other examples, the authentication key for the two regions may be the same.

Platform engine 210 does not send update tokens to the leader IoT devices in regions 2000A and 2000B.

Referring to FIG. 3C, secondary IoT device 251A in region 2000A may send the update token A 301A (which it received from platform engine 210) to leader IoT device 250A. Based on the address in the update token, secondary IoT device 251A knows which device in region 2000A is the leader device. Similarly, secondary IoT device 252A and the other secondary IoT devices each send the update token A 301A to leader IoT device 250A.

Leader IoT device 250A receives the update tokens A 301A from each secondary IoT device 251A-25NA. It validates each update token A received from the individual secondary IoT devices and then sends each secondary IoT device the firmware update 300. This firmware update is similar to the firmware update the leader IoT device 250A received from server 200.

At substantially the same time that secondary IoT devices in region 2000A are communicating with leader IoT device 250A, the secondary IoT devices in region 2000B may be communicating with the leader IoT device 250B. Based on the address in the update token B, secondary IoT device 251B knows which device in region 2000B is the leader device and sends update token B to leader IoT device 250B.

Similarly, secondary IoT device 252B and the other secondary IoT devices each send the update token B 301B to leader IoT device 250B. Leader IoT device 250B receives the update tokens B 301B from each secondary IoT device 251B-25NB. It validates each update token B received from the individual secondary IoT devices and then sends each secondary IoT device the firmware update 300. This firmware update is similar to the firmware update the leader IoT device 250B received from server 200 and is also similar to the firmware update leader IoT device 250A sends to the secondary IoT devices in region 2000A.

Figure 4A:
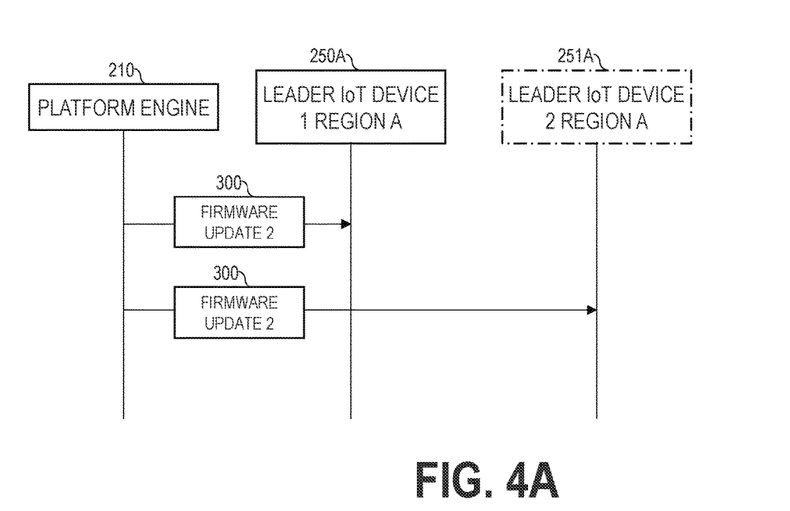
FIG. 4A is a representation of the communications between the IoT platform and a number of leader IoT devices in the IoT system of FIG. 2 in a second instructions update, according to some examples.

Additionally, in some examples, IoT system 2000 may include more than one leader IoT device in a region. FIGS. 4A-4O show a representation of communications between leader IoT devices in region 2000A when there is more than one leader IoT device. This may be in a subsequent firmware update that occurs after the firmware update referred to in FIGS. 3A-3C.

In FIG. 4, platform engine 210 of server 200 determines that IoT device 250A is a leader IoT device in region 2000A. This can be based on indication that IoT device 250A was a leader in the firmware update process in FIGS. 3A-3C. Additionally, platform engine 210 determines that IoT device 251A is an additional leader IoT device in region 2000A. In FIG. 4A, the changing in status of IoT device 251A from secondary IoT device to a leader IoT device is represented by dotted lines. This change in status may be because platform engine 210 determines that region 2000A requires an additional leader IoT device in region 2000A due to an increase in IoT devices in region 2000A or an increase in desired update speed of region 2000A. Additionally, it may be because IoT device 251A now meets certain requirements to be a leader IoT device that it did not meet for the update process in FIGS. 3A-3C. Platform engine 210 sends firmware update 2 to leader IoT devices 250A and 251A.

Figure 4B:
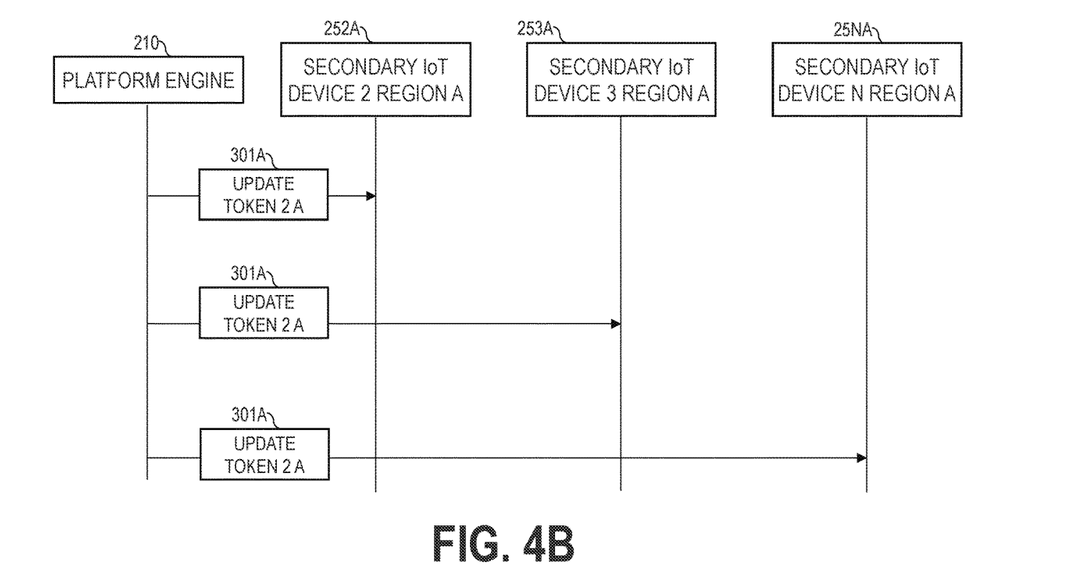
FIG. 4B is a representation of the communications between the IoT platform and a number of secondary IoT devices in the IoT system of FIG. 2 in a second instructions update, according to some examples.

In FIG. 4B, platform engine 210 sends an update token 2 for firmware update 2 to the remaining IoT devices in region 2000A. This group of remaining IoT devices does not include IoT device 251A as it is now a leader IoT device. The update token 2 may be different from the update token sent to the secondary IoT devices in FIG. 3A because it may now include two addresses, one for leader IoT device 250A and another for leader IoT device 251A. This allows the remaining IoT devices in region 2000A to connect with either leader IoT device 250A or leader IoT device 251A.

Figure 4C:
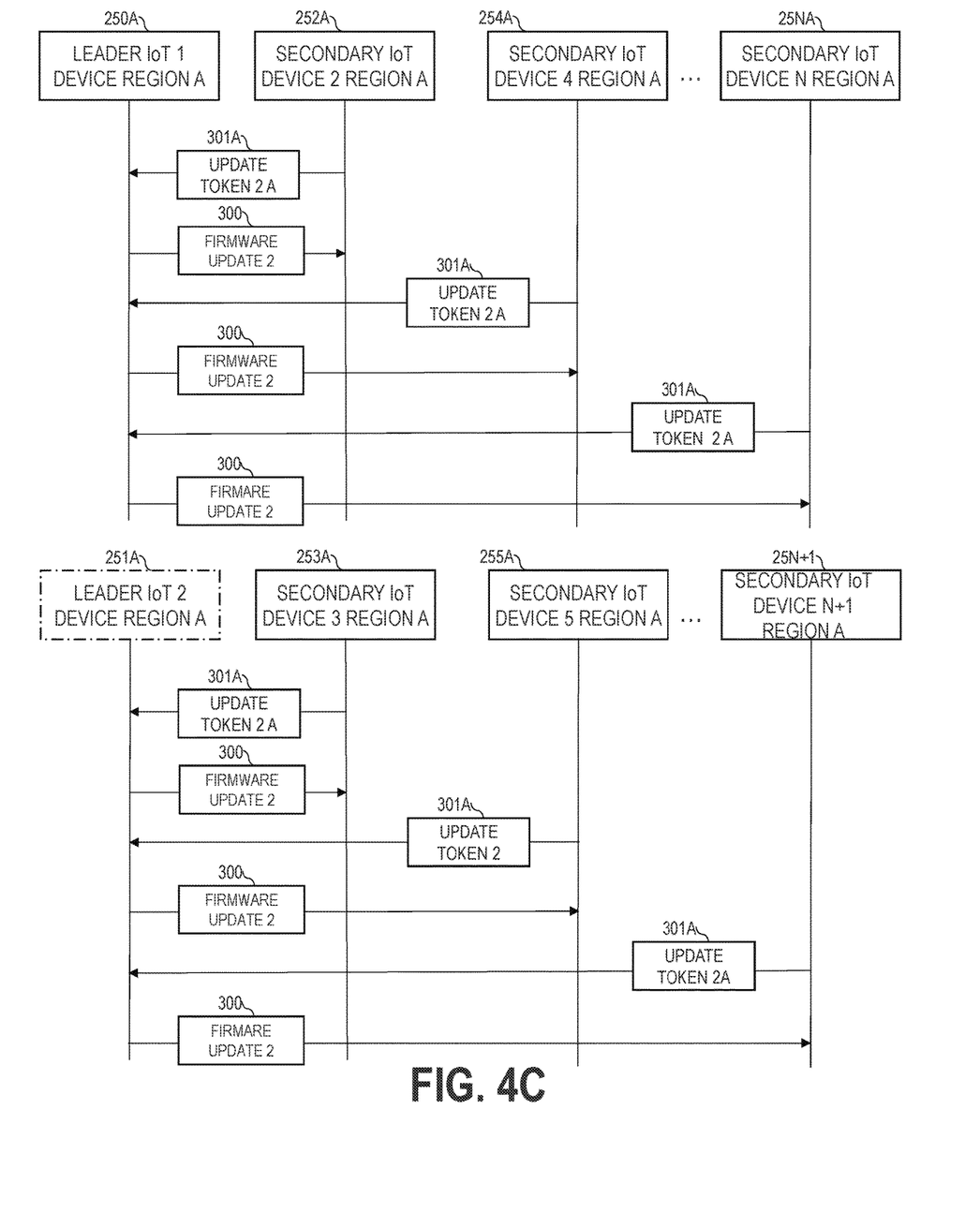
FIG. 4C is a representation of the communications between the leader IoT devices and number of secondary IoT devices in the IoT system of FIG. 2 in a second instructions update, according to some examples.

In FIG. 4C, leader IoT device 250A receives the update token 2 from secondary IoT devices 252A and 254A through 25NA while leader IoT device 251A receives the update token 2 from secondary IoT devices 253A and 255A through 25N+1A. Accordingly, the region 2000A may be updated via two leader IoT devices 250A and 251A. These updates may occur simultaneously and allows for region 2000A to be updated quicker than compared to with one leader IoT device. While FIGS. 4A-4C discuss the update occurring as being subsequent (after) the update occurring in FIGS. 3A-3C, in some examples, the update can occur with more than one IoT devices in any update, including a first firmware update.

Accordingly, examples discussed herein allow for IoT devices in a region to receive an update from another IoT device in the same region rather than having to queue for a firmware update directly from server 200. Thus, multiple regions of IoT devices may be updated at the same time leading to a faster update of IoT system 2000 as compared to a system in which a central server provides the firmware update to every IoT device.

For example, assuming that a server has a capacity to upgrade 1000 IoT devices per minute, it would take roughly 16 hours to update 1 million IoT devices and 7 days to update 10 million IoT devices. In comparison, with an IoT system that practices the examples discussed herein, and assuming that each IoT device in the IoT system has a capability to upgrade m other devices at the same time in each iteration, the number of devices that can be updated in a fixed time could be calculated as:

$$X=(m+1)^{(n-1)}$$

where x denotes the number of devices that are updated and n denotes the current iteration.

Thus, in a system that practices the examples disclosed herein and each IoT device has the capability to update 2 other IoT devices simultaneously, updating 1 Million IoT devices will take 12 minutes and updating 10 million IoT devices will take 15 minutes.

Accordingly, examples discussed herein allow for the cascading of updates resulting in decreased firmware update times for robust IoT systems.

Figure 5:
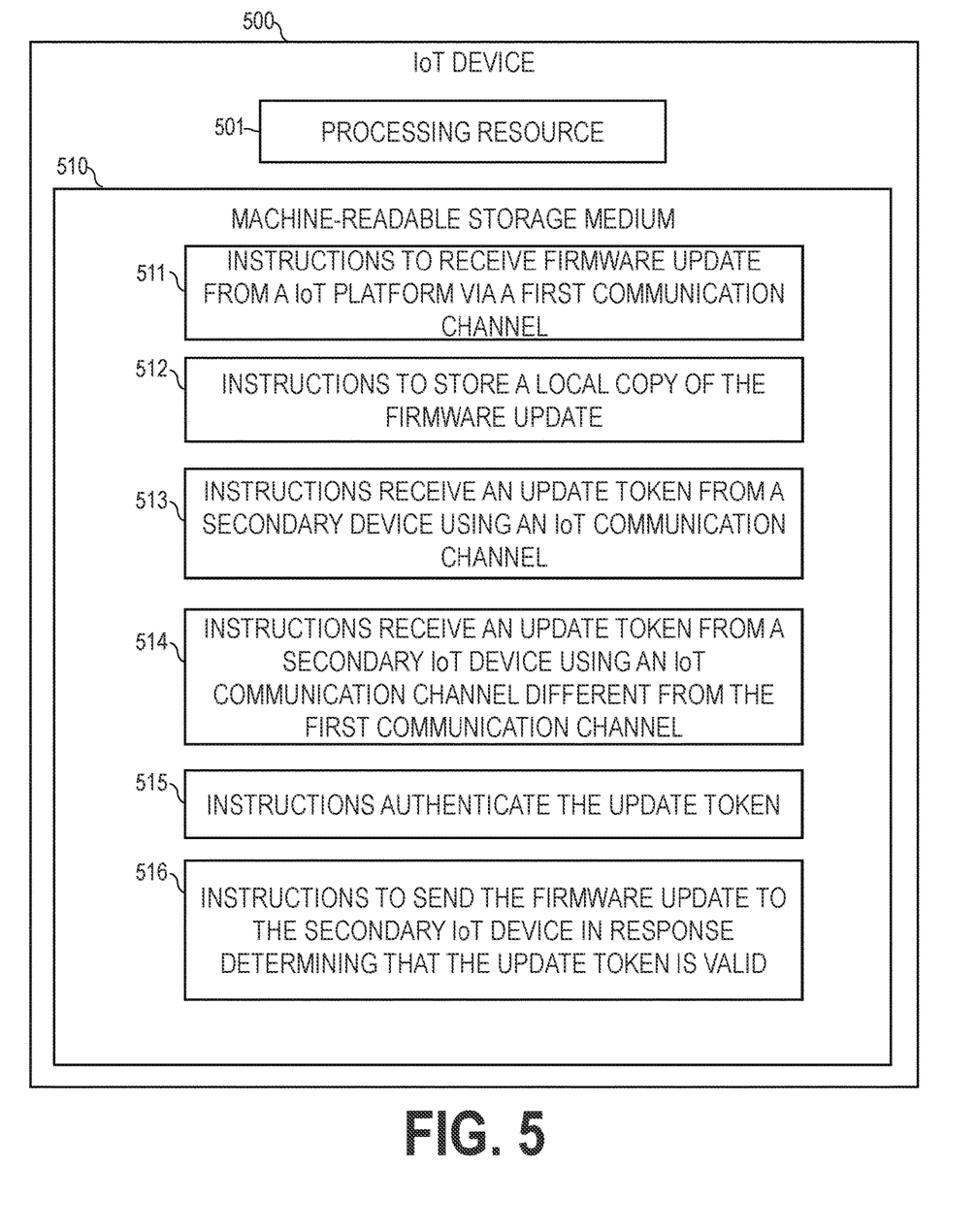
FIG. 5 is a block diagram of an IoT device that sends instructions update to secondary IoT devices, according to some examples.

IoT device 500 includes a processing resource 501 and a machine-readable storage medium 510. Machine readable storage medium 510 may be in the form of non-transitory machine-readable storage medium, such as suitable electronic, magnetic, optical, or other physical storage apparatus to contain or store information such as instructions 511, 512, 513, 514, 515, 516, related data, and the like.

In the example of FIG. 5, instructions 511, 512, 513, 514, 515, and 516 are stored (encoded) on storage medium 510 and are executable by processing resource 501 to implement functionalities described herein in relation to FIG. 5. In some examples, storage medium 510 may include additional instructions. For example, IoT device 500 may include instructions that allow it to perform its IoT functions, such as sensing, recording, and reporting data about its environment. These instructions are not shown in FIG. 5. In other examples, the functionalities of any of the instructions of storage medium 510 may be implemented in the form of electronic circuitry, in the form of executable instructions encoded on machine-readable storage medium, or a combination thereof.

Processing resource 501 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 511, 512, 513, 514, 515, and 516 as described herein. In some examples, as compared to processing resource 101, processing resource 501 may be smaller or more compact as to accommodate the environment of IoT device 500.

Instructions 511 may be executable by processing resource 501 to receive a firmware update from an IoT platform. This firmware update may be received by a communication channel that allows for communication outside of a low power wide area network that IoT device 500 is located in. For example, the IoT platform may be hosted at a remote server. In some examples, instructions 511 may be executable to receive an authentication key from the IoT platform that may be used to validate an authentication key received from other IoT devices, as discussed below.

Instructions 512 may be executable by processing resource 501 to store a local copy of the firmware update such that the copy may be sent to other IoT devices in the low power wide area network that IoT device 500 is located in. Instructions 513 may be executable by processing resource 501 to receive an update token from a secondary IoT device in the LPWAN region of IoT device 500. This update token may be received via a different communication channel than the one that is used to received the firmware update. For example, the update token may be received using the LPWAN protocol, which allows IoT devices in the same region to send low power communication packets to each other.

Instructions 515 may be executable by processing resource 501 to validate the update token. For example, the update token may comprise an authentication key. Accordingly, IoT device 500 may validate the authentication key received from the secondary IoT device by comparing it to the authentication key it received from the IoT platform. In other examples, the IoT device 500 may validate the authentication key by determining that it meets certain algorithms and/or criteria that is pre-set by an administrator of the IoT platform.

Instructions 516 may be executable by processing resource 501 to send the firmware update to the secondary IoT device in response to determining that the update token is valid.

IoT device 500 of FIG. 5, which is described in terms of processors and machine-readable storage mediums, can include one or more structural or functional aspects of IoT device of FIG. 2, which is described in terms of engines containing hardware and software.

Figure 6:
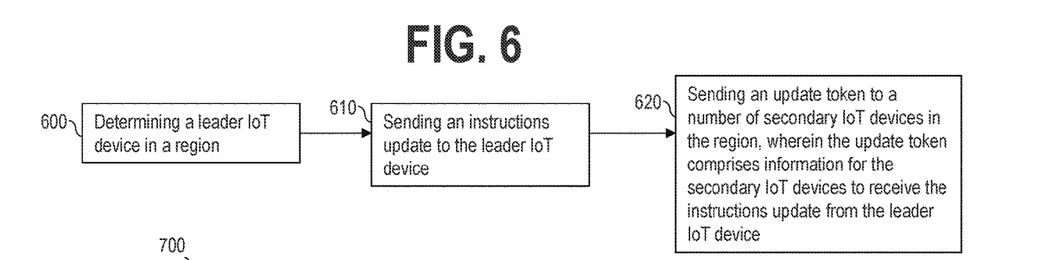
FIG. 6 is a flowchart of a method of sending an update token to secondary IoT devices, according to some examples.

FIG. 6 illustrates a flowchart for a method 600 of sending a firmware update to a leader IoT device and an update token to a secondary IoT device. Although execution of method 600 is described below with reference to computing device 100, other suitable devices for execution of method 600 may be used.

At 600, processing resource 101 may execute instructions 111 to determine a leader IoT device in a region. At 610, processing resource 101 may execute instructions 112 to send a firmware update to the leader IoT device. At 620, processing resource 101 may execute instructions 113 to send an update token to a number of secondary IoT devices in the region. The update token may include information for the secondary IoT devices to receive the firmware update from the leader IoT device. In some examples, the information may include an authentication key and an address for the leader IoT device.

Although the flowchart of FIG. 6 shows a specific order of performance of certain functionalities, method 600 is not limited to that order. For example, some of the functionalities shown in succession may be performed in a different order, may be executed concurrently or with partial concurrence, or a combination thereof. In some examples, functionalities described herein in relation to FIG. 6 may be provided in combination with functionalities described herein in relation to any of FIGS. 1-5 and FIG. 7. Method 500 may also comprise additional steps not shown.

Figure 7:
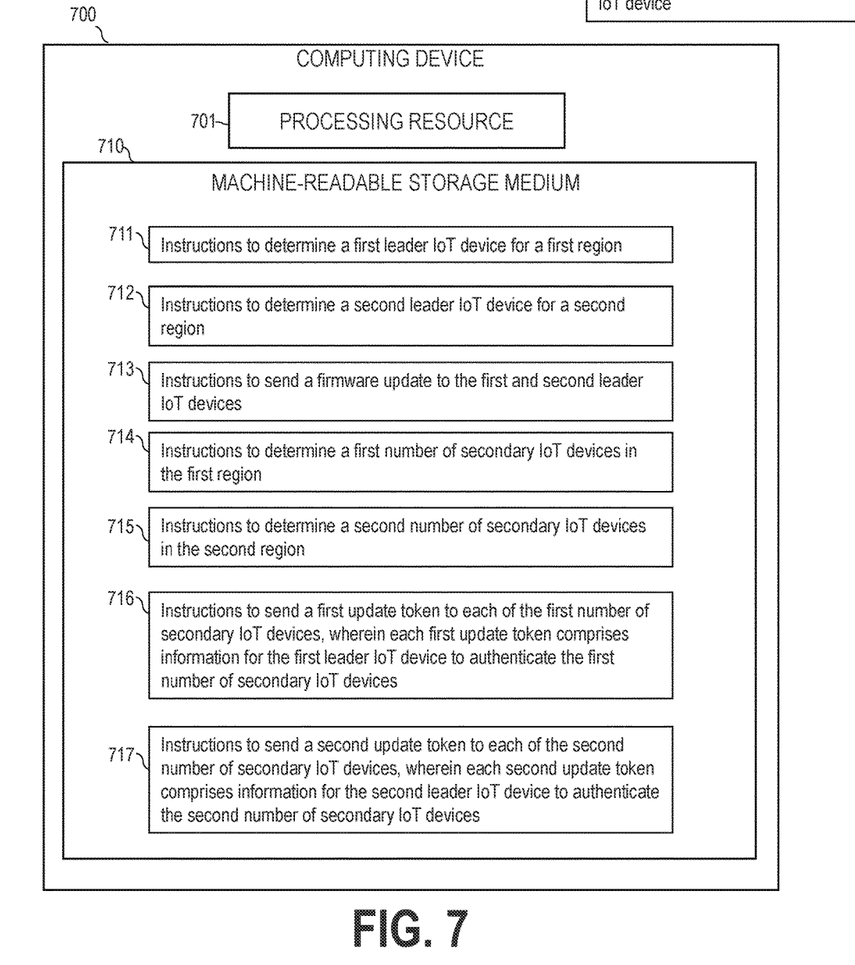
FIG. 7 is a flowchart of a method of sending update tokens to a first and a second set of secondary IoT devices, according to some examples.

FIG. 7 is a block diagram of a computing device 700 to send an instructions update to a leader IoT device in two different regions. In some examples, computing device 700 may be a server, like the one shown in FIG. 2.

Computing device 700 includes a processing resource 701 and a machine-readable storage medium 710. Machine readable storage medium 710 may be in the form of non-transitory machine-readable storage medium, such as suitable electronic, magnetic, optical, or other physical storage apparatus to contain or store information such as instructions 711, 712, 713, 714, 715, 716, 717, related data, and the like.

Instructions 711 may be executable by processing resource 701 to determine a leader IoT device in a first region. Instructions 712 may be executable by processing resource 701 to determine a second leader IoT device in a second region. As used herein, the terms "first", "second", "third" are used to differentiate one similarly labeled item from another similarly labeled item and may or may not coincide to an order in which they are used. Accordingly, the "first" region is different from "second" region.

Instructions 713 may be executable by processing resource 701 to send a firmware update to both the first and second leader IoT devices. The firmware update sent to each leader IoT device may be the same. Instructions 713 may also include instructions to send an authentication key to both the first and second leader IoT devices. In some examples, the authentication key is the same for both. In some examples, the authentication key is different from each other.

Instructions 714 may be executable by processing resource 701 to determine a first number of secondary IoT devices in the first region. Instructions 715 may be executable by processing resource 701 to determine a second number of secondary IoT devices in the second region. Instructions 716 may be executable by processing resource 701 to send a first update token to the each of the first number of secondary IoT devices. Each first update token includes information for the first leader IoT to authenticate the first number of secondary IoT devices. In some examples, the first update token may include an authentication key that the secondary IoT device may send to the first leader IoT device. Additionally, the update token may include an address for the first leader IoT device.

Instructions 717 may be executable by processing resource 701 to send a second update token to the each of the second number of secondary IoT devices. Each second update token includes information for the second leader IoT to authenticate the second number of secondary IoT devices. In some examples, the second update token may include an authentication key that the secondary IoT device may send to the second leader IoT device. Additionally, the update token may include an address for the second leader IoT device. Accordingly, the first update token may be different from the second update token.

Computing device 700 of FIG. 7, which is described in terms of processors and machine-readable storage mediums, can include one or more structural or functional aspects of server 200 of FIG. 2, which is described in terms of engines containing hardware and software.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A method comprising:
   determining, by a processing resource, a first leader Internet of Things (IoT) device in a region, wherein the determining of the first leader IoT device comprises:
      determining configurations of a plurality of IoT devices in the region, and
      selecting, based on which of the configurations of the plurality of IoT devices in the region fulfills a target capability, the first leader IoT device from the plurality of IoT devices;
   sending, by the processing resource, an instructions update to the first leader IoT device;
   sending, by the processing resource, a first update token to a plurality of secondary IoT devices in the region, wherein the first update token comprises information including a first address of the first leader IoT device, the first address of the first leader IoT device useable by the plurality of secondary IoT devices to receive the instructions update from the first leader IoT device;
   determining, by the processing resource, that an update speed is to be increased in the region to more quickly update one or more additional secondary IoT devices in the region than a current update speed;
   in response to determining that the update speed is to be increased in the region:
      selecting a secondary IoT device of the plurality of secondary IoT devices based on a configuration of the secondary IoT device fulfilling the target capability, and
      changing a status of the selected secondary IoT device to a second leader IoT device such that the region includes the first leader IoT device and the second leader IoT device; and
   sending, by the processing resource, a second update token to the one or more additional secondary IoT devices in the region, the second update token comprising a second address of the second leader IoT device, the second address of the second leader IoT device useable by the the one or more additional secondary IoT devices to receive the instructions update from the second leader IoT device.

2. The method of claim 1, wherein the plurality of secondary IoT devices are to communicate over a low power wide area network (LPWAN) with the first leader IoT device.

3. The method of claim 1, wherein the first update token comprises an authentication key that allows the first leader IoT device to determine that a secondary IoT device that sent the first update token to the first leader IoT device has permission to receive the instructions update from the first leader IoT device.

4. The method of claim 1, wherein the first leader IoT device and a subset of the plurality of secondary IoT devices are part of a first group of IoT devices, and the one or more additional secondary IoT devices and the second leader IoT device are part of a second group of IoT devices.

5. The method of claim 4,
   wherein the subset of the plurality of secondary IoT devices excludes the second leader IoT device.

6. The method of claim 1 comprising:
   receiving the first update token by the first leader IoT device from a first secondary IoT device of the plurality of secondary IoT devices;
   validating, by the first leader IoT device, the first secondary IoT device based on the first update token from the first secondary IoT device; and
   in response to the validating, sending, by the first leader IoT device, the instructions update to the first secondary IoT device.

7. The method of claim 1, wherein the target capability is a hardware capability or a software capability, and wherein the selecting of the first leader IoT device comprises selecting an IoT device from the plurality of IoT devices that has a configuration that fulfills the hardware capability or the software capability.

8. The method of claim 1 comprising:
determining, by the processing resource, that the plurality of IoT devices are in the region based on a determination by the processing resource that the plurality of IoT devices are within a communication range of one another.

9. The method of claim 1, wherein the instructions update comprises a firmware update.

10. The method of claim 1, wherein the processing resource is part of a server that is separate from the first leader IoT device and the second leader IoT device.

11. A system comprising:
a processor; and
a non-transitory storage medium storing instructions executable on the processor to:
 determine a first leader Internet of Things (IoT) device by:
  determining configurations of a plurality of IoT devices in a region, and
  selecting, based on which of the configurations of the plurality of IoT devices in the region fulfills a target capability, the first leader IoT device from the plurality of IoT devices;
 send an instructions update to the first leader IoT device;
 send a first update token to a plurality of secondary IoT devices in the region, wherein the first update token comprises information including a first address of the first leader IoT device, the first address of the first leader IoT device useable by the plurality of secondary IoT devices to receive the instructions update from the first leader IoT device;
 determine that an update speed is to be increased in the region to more quickly update one or more additional secondary IoT devices in the region than a current update speed;
 in response to determining that the update speed is to be increased in the region:
  select a secondary IoT device of the plurality of secondary IoT devices based on a configuration of the secondary IoT device fulfilling the target capability, and
  change a status of the selected secondary IoT device to a second leader IoT device such that the region includes the first leader IoT device and the second leader IoT device; and
 send a second update token to the one or more additional secondary IoT devices in the region, the second update token comprising a second address of the second leader IoT device, the second address of the second leader IoT device useable by the one or more additional secondary IoT devices to receive the instructions update from the second leader IoT device.

12. The system of claim 11, wherein the instructions update comprises a firmware update.

13. The system of claim 11, wherein the first address is a first Internet Protocol (IP) address of the first leader IoT device, and the second address is a second IP address of the second leader IoT device.

14. The system of claim 11, wherein the first update token comprises an authentication key that allows the first leader IoT device to determine that a secondary IoT device that sent the first update token to the first leader IoT device has permission to receive the instructions update from the first leader IoT device.

15. The system of claim 11, wherein the instructions are executable on the processor to:
determine that the plurality of IoT devices are in the region based on a determination by the instructions that the plurality of IoT devices are within a communication range of one another.

16. The system of claim 11, wherein the first leader IoT device and a subset of the plurality of secondary IoT devices are part of a first group of IoT devices, and the one or more additional secondary IoT devices and the second leader IoT device are part of a second group of IoT devices.

17. The system of claim 16, wherein the subset of the plurality of secondary IoT devices excludes the second leader IoT device.

18. A non-transitory machine-readable storage medium comprising instructions, that when executed, cause a processing resource of a server to:
determine a first leader Internet of Things (IoT) device by
 determining configurations of a plurality of IoT devices in a region, and
 selecting, based on which of the configurations of the plurality of IoT devices in the region fulfills a target capability, the first leader IoT device from the plurality of IoT devices;
send a firmware update to the first leader IoT device;
send a first update token to a plurality of secondary IoT devices in the region, wherein the first update token comprises information including a first address of the first leader IoT device, the first address of the first leader IoT device useable by the plurality of secondary IoT devices to receive the firmware update from the first leader IoT device;
determine that an update speed is to be increased in the region to more quickly update one or more additional secondary IoT devices in the region than a current update speed;
in response to determining that the update speed is to be increased in the region:
 select a secondary IoT device of the plurality of secondary IoT devices based on a configuration of the secondary IoT device fulfilling the target capability, and
 change a status of the selected secondary IoT device to a second leader IoT device such that the region includes the first leader IoT device and the second leader IoT device; and
send a second update token to the one or more additional secondary IoT devices in the region, the second update token comprising a second address of the second leader IoT device, the second address of the second leader IoT device useable by the one or more additional secondary IoT devices to receive the firmware update from the second leader IoT device.

19. The non-transitory machine-readable storage medium of claim 18, wherein the target capability is a hardware capability or a software capability, and wherein the selecting of the first leader IoT device comprises selecting an IoT device from the plurality of IoT devices that has a configuration that fulfills the hardware capability or the software capability.

20. The non-transitory machine-readable storage medium of claim 18, wherein the first leader IoT device and a subset of the plurality of secondary IoT devices are part of a first group of IoT devices, and the one or more additional secondary IoT devices and the second leader IoT device are part of a second group of IoT devices.

21. The non-transitory machine-readable storage medium of claim 20, wherein the subset of the plurality of secondary IoT devices excludes the second leader IoT device.

\* \* \* \* \*